Nov. 30, 1971 R. W. SKOMIAL ET AL 3,623,246

MOBILE TRENCH EXCAVATING APPARATUS

Filed May 7, 1969 5 Sheets-Sheet 1

INVENTORS
Roy W. Skomial, &
BY Bert C. Van Giesen
Dale A. Winnie
ATTORNEY

Nov. 30, 1971 R. W. SKOMIAL ET AL 3,623,246

MOBILE TRENCH EXCAVATING APPARATUS

Filed May 7, 1969 5 Sheets-Sheet 2

INVENTORS
Roy W. Skomial, &
BY Bert C. Van Giesen

Dale A. Winnie
ATTORNEY

MOBILE TRENCH EXCAVATING APPARATUS

Filed May 7, 1969 5 Sheets-Sheet 3

INVENTORS
Roy W. Skomial, &
BY Bert C. Van Giesen
Dale A. Winnie
ATTORNEY

MOBILE TRENCH EXCAVATING APPARATUS

INVENTORS
Roy W. Skomial, &
BY Bert C. Van Giesen
Dale A. Winnie
ATTORNEY

INVENTORS
Roy W. Skomial, &
BY Bert C. Van Giesen
Dale A. Winnie
ATTORNEY

United States Patent Office 3,623,246
Patented Nov. 30, 1971

3,623,246
MOBILE TRENCH EXCAVATING APPARATUS
Roy W. Skomial, Warren, Mich. (2900 W. Wardlow, Highland, Mich. 48031), and Bert C. Van Giesen, 2514 Banner, Ferndale, Mich. 48220
Filed May 7, 1969, Ser. No. 822,493
Int. Cl. E02f 5/06
U.S. Cl. 37—86 7 Claims

ABSTRACT OF THE DISCLOSURE

A trenching apparatus situated on a vehicle for mobility has a mounting frame in turn supporting a pivotal trenching or digging boom assembly which can be pivoted to varying positions including a trenching or digging position; a soil or dirt deflector operatively carried by the frame serves to deflect the dirt, dug by the trenching boom, to one side of the resulting trench and a powered conveyor device of an auger or screw-like configuration serves to convey the deflected dirt or soil a substantial distance away from the trench in order to prevent the said dirt from falling back into the trench; the trenching boom assembly is mounted to one side of and generally outboard of the vehicle thereby enabling the digging of a trench in close proximity to an existing structure or wall if necessary.

BACKGROUND OF THE INVENTION

Heretofore, various forms of trenching arrangements have been proposed. Such trenching arrangements can be broadly classified into two catagories; the first of such catagories consists of those trenching arrangements employing a trenching or digging wheel of circular configuration. Such wheel-type trenchers are extremely costly in that they require a wheel diameter at least twice the depth to which the trench is to be dug. Accordingly, in order to dig an eight foot deep trench it would be necessary to have at least a sixteen-foot diameter digging wheel. Of this, at least three-fourths of the wheel is not employed in the actual digging operation. Further, the power required to drive trenching wheels is usually quite great because of the reaction force developed by the digging and the lever arm (substantially equal to the radius of the wheel) to which such reaction force is applied.

Additionally, such wheel type trenchers, because of the structure employed in forming the wheel, are substantially heavier than other types of trenchers. This added weight often makes it difficult to employ such wheel trenching structures on wet ground because of the tendency of the overall trenching apparatus to sink into the ground. Such added weight also creates problems in transporting the trenching apparatus from one location to another because the trailer by which such transportation is accomplished must be of substantially greater strength and consequently greater weight.

Further, if a trencher with a sixteen foot wheel diameter was to be transported, it can be seen that problems can often occur because of the comparatively great height to which the upper portion of the wheel would extend especially after placing such a trencher atop a trailer.

The second catagory of trenchers would include the boom-type trencher or digger. Such trenchers employ a digging arrangement carried by a boom assembly which is pivotally mounted at one end to a cooperating vehicle. The digging arrangement of ten is comprised of a continuous driven chain generally looped about the boom assembly and carrying a plurality of spaced digger teeth. The boom assembly is lowered into its digging position as by rotating it downwardly about its pivoted end.

One of the major problems of the prior art boom-type trenchers was their inability to dig a trench close to a wall or other existing structure because such boom assemblies were mounted generally inboard of the vehicle on which they were mounted. Another problem of the boom-type trencher structures was the fact that the dirt which was dug had the tendency to fall back into the trench. This meant that the trench, once dug, often had to undergo a second digging operation, often manually, in order to clean-out the dirt which fell back into the trench.

The invention as herein disclosed concerns itself with the solution of the above as well as other problems.

SUMMARY OF THE INVENTION

According to the invention a trenching apparatus comprises supporting means adapted to be carried by a vehicle, a boom-type powered digging structure pivotally carried at one end and operatively connected to said supporting means, loose-dirt deflector means operatively carried by said supporting means and adapted to deflect such loose-dirt as is dug by said boom-type digging structure, and powered conveyor means operatively carried by said supporting means, said conveyor means being effective to physically move said deflected loose-dirt a substantial distance away from the trench which is being dug by said boom-type digging structure.

Accordingly, a general object of this invention is to provide a trenching apparatus as set forth above.

Another object of this invention is to provide a trenching apparatus as set forth above wherein said boom-type digging structure is situated as to be mounted generally eccentrically of said vehicle.

Another more specific object of this invention is to provide a trenching apparatus as set forth above wherein said boom-type digging structure is situated as to be mounted outboard of said vehicle.

Other more specific objects and advantages of the invention will become apparent when reference is made to the following detailed description considered in conjunction with the accompanying drawings.

DESCRIPTION OF THE DRAWINGS

In the drawings, where, for purposes of clarity, certain details may be omitted from one or more views.

DESCRIPTION OF THE PREFERRED EMBODIMENTS

Figure 1:
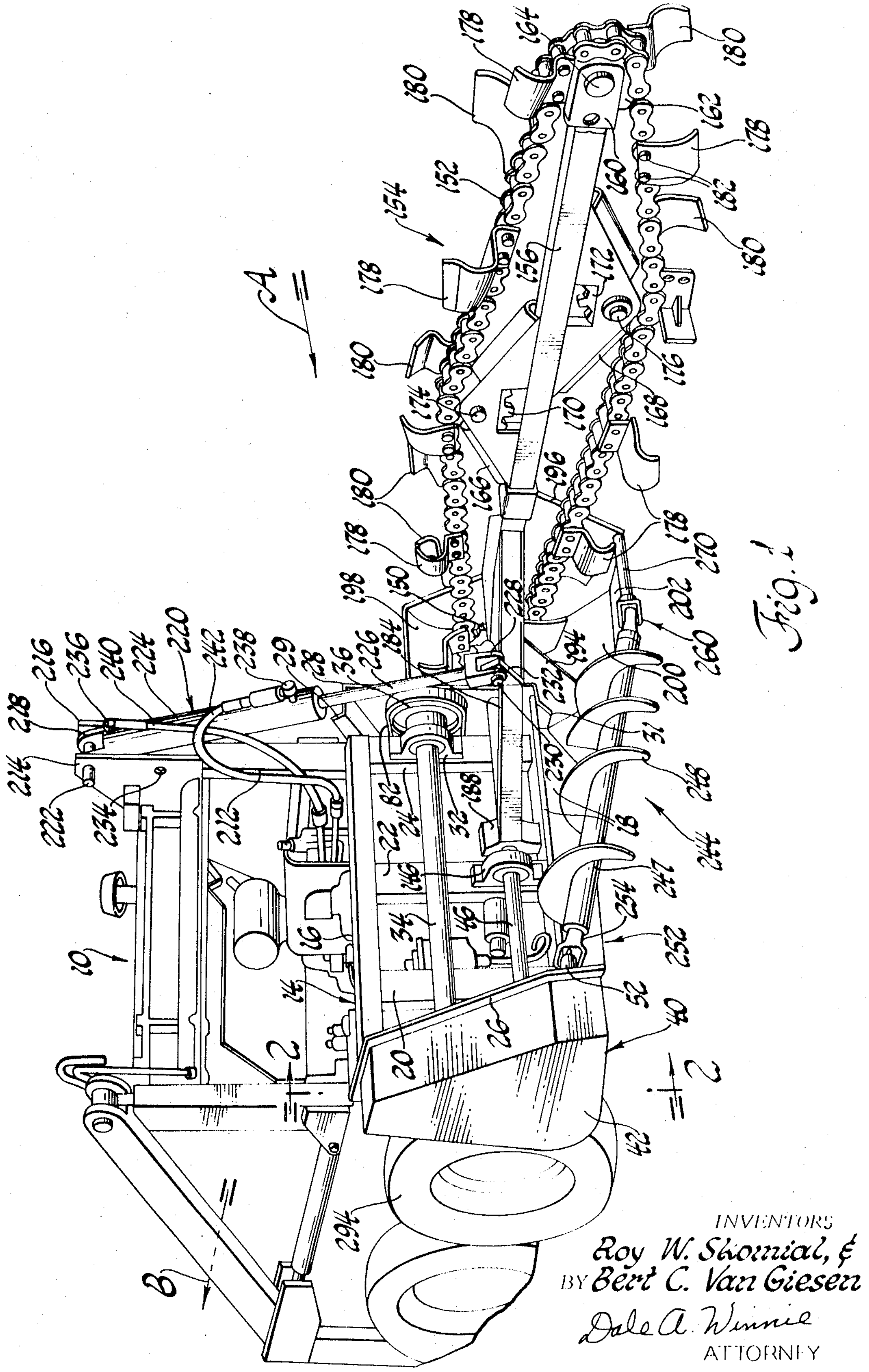
FIG. 1 is an elevational perspective view of a suitable vehicle and a trenching apparatus constructed in accordance with the teachings of this invention.

Referring now in greater detail to the drawings, FIG. 1 illustrates a tractor 10 equipped with a trenching apparatus 12 constructed in accordance with the teachings of the invention. The trenching apparatus 12 is illustrated as being comprised of a mounting frame 14, comprised of horizontally disposed frame members 16 and 18, vertically extending frame members 20, 22 and 24 and end frame or support plate-like members 26 and 28 which may be welded to each other to form a unitized structure, suitably secured to the rearward end of the tractor 10 as by a plurality of screws (not shown). A pair of bearing blocks 30 and 32 respectively secured to and carried by vertical frame member 24 and end support plate 26 contain suitable bearing members which, in turn, rotatably support a primary input shaft 34. The primary input shaft is connected at one end to a sheave 36 and is also connected at its other end to a drive gear 38. The drive gear 38 is contained within a gear box assembly 40 which includes a cover 42 detachably secured to the vertically extending support plate 26 which, as previously stated, forms a part of the overall frame assembly 14.

Figure 2:
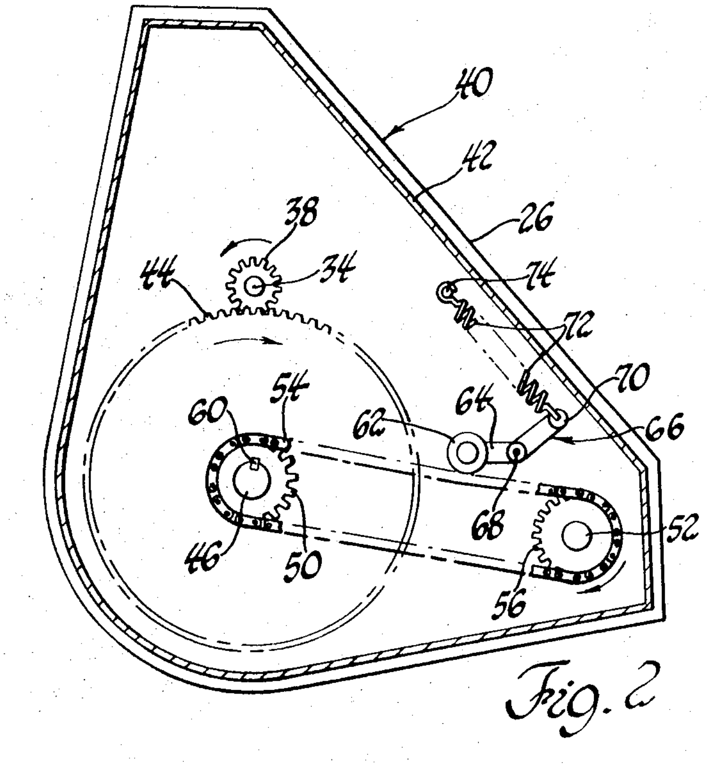
FIG. 2 is an enlarged cross-sectional view taken generally on the plane of line 2—2 of FIG. 1 and looking in the direction of the arrows.
Figure 4:
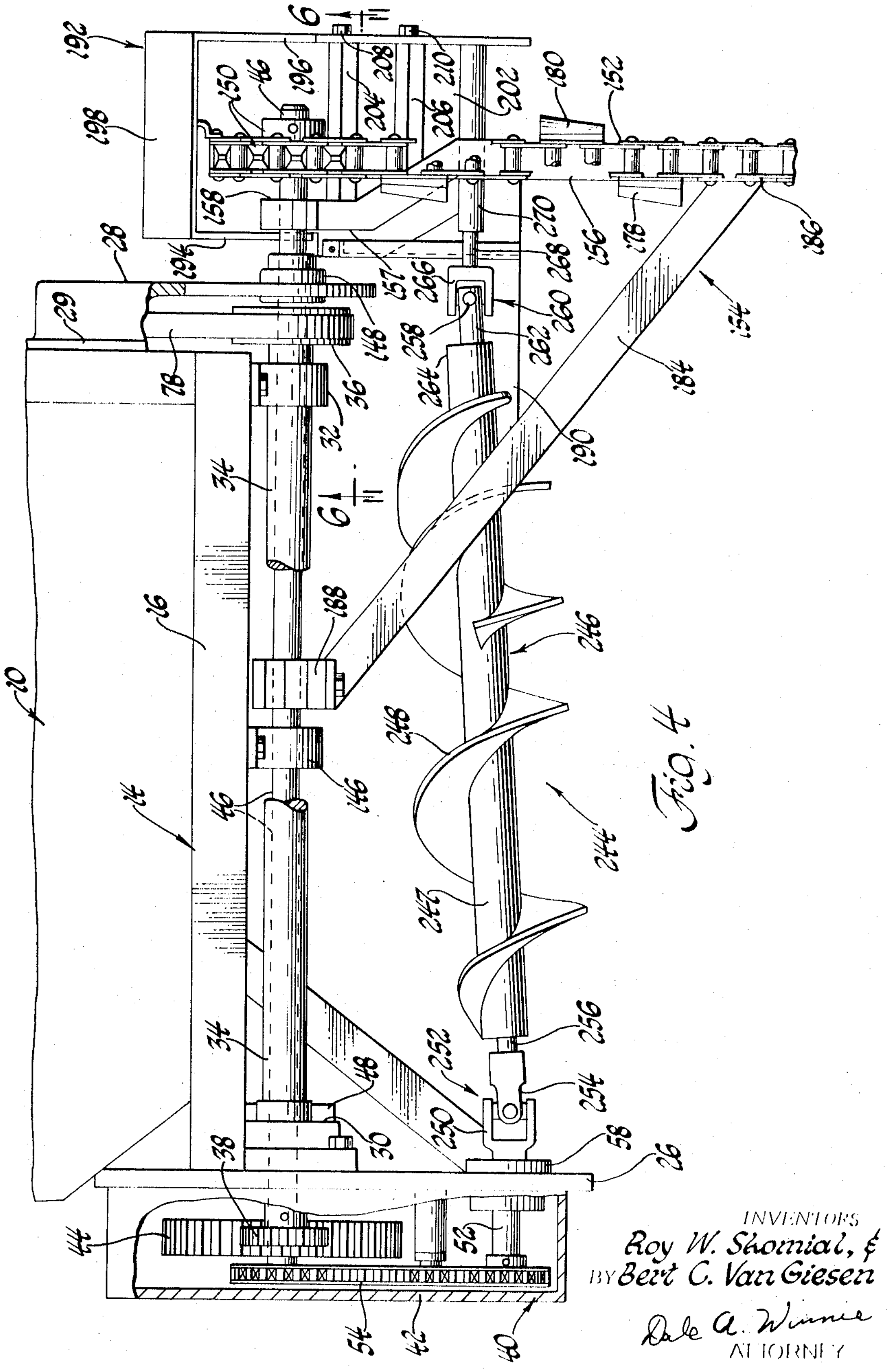
FIG. 4 is an enlarged fragmentary top plan view of the trenching apparatus of FIG. 1.

As shown in FIGS. 2 and 4, the drive gear 38 is in meshed engagement with a relatively large driven gear 44 mounted on and for rotation with a drive shaft 46 which is journalled near one end in a suitable bearing carried within a bearing block 48 secured to and carried by the end support plate 26. A second driven gear 50, also mounted on the shaft 46 for rotation therewith, transmits power to a driven stub shaft 52 as by means of a link belt 54 engaging gear 50 and a gear 56 mounted on the stub shaft 52 for rotation therewith. As in the case of shafts 34 and 46, stub shaft is also suitably journalled within a bearing carried by a bearing block 58 secured to and carried by the end support plate 26. Although not specifically shown, it is apparent that the various gears and sheaves disclosed herein may be mounted on their respective shafts by any suitable driving connection means such as cooperating flatted portions or keying means such as typically illustrated at 60.

In order to compensate for any possible slack in the chain belt 54, an idler type wheel (which may be a pure roller or a gear-type wheel) 62 is provided for engaging the chain belt 54 in order to somewhat depress the chain belt as shown in FIG. 2 and thereby compensate for the slack. Idler wheel 62 may be pivotally mounted on an arm 64 of a lever 66 which is pivotally carried by the support plate 26 as at 68. Lever 66 also includes a second arm 70 which is operatively connected to one end of a tension spring 72 which is anchored at its other end to support plate 26 as by a suitable spring anchor member 74.

Figure 3:
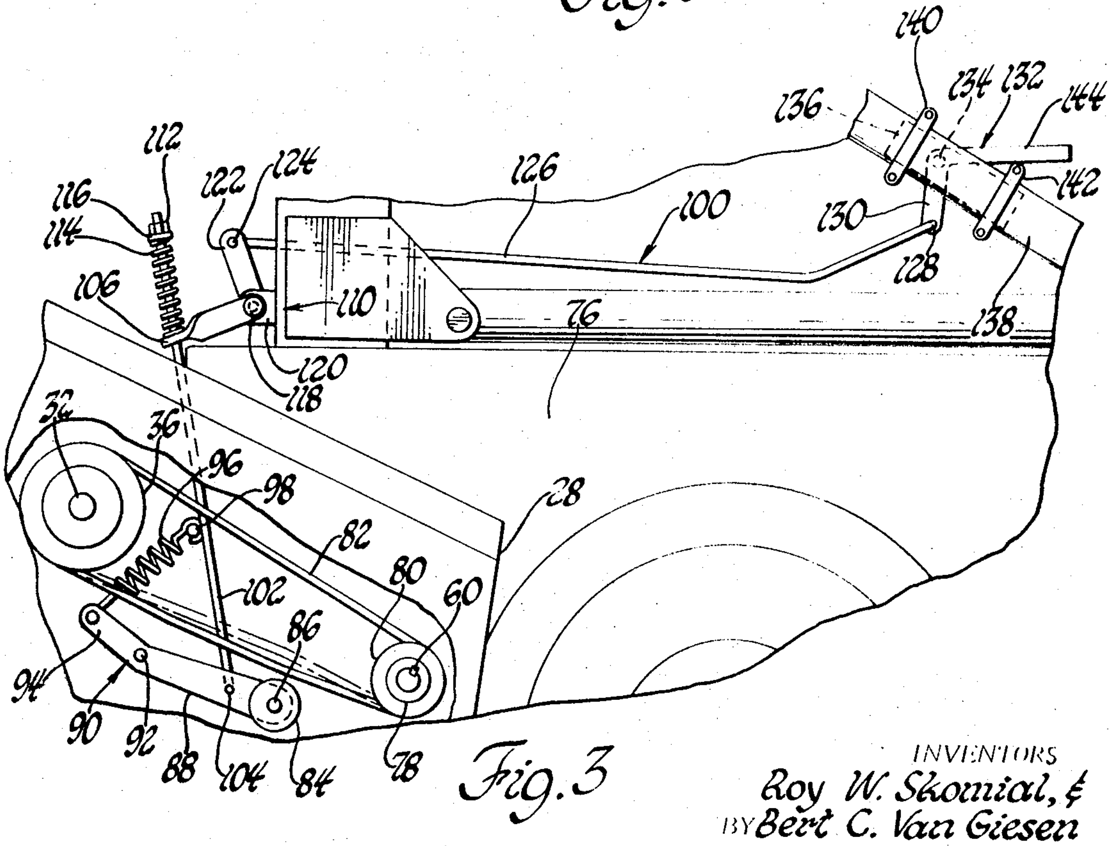
FIG. 3 is an enlarged fragmentary view of the opposite side of the structure taken generally in the direction of arrow, A, in FIG. 1 with certain portions thereof broken away for purposes of clarity.

As shown in both FIGS. 1 and 3, the sheave 36 is generally housed within the end support plate 28 which is preferably shaped to have a configuration providing, in effect, a protective cover. The plate or cover 28 may also be secured to the vehicle body or frame 76 by a plurality of generally peripherally situated screws (not shown).

A portion of the support plate or protective cover 28 is broken away in FIG. 3 to better illustrate the arrangement for obtaining power from the tractor or vehicle 10 and supplying it to the trenching apparatus 12. In FIG. 3, a main power takeoff shaft 78, operatively connected to and driven by the tractor engine, is provided with a sheave 80 which has a groove (or a plurality of grooves) formed circumferentially thereabout adapted for the cooperative reception therein of a flexible belt 82 (or a plurality of belts if a plurality of grooves are provided) which is also looped about the sheave 36 for driving engagement therewith.

A clutching-like arrangement for causing driving engagement between belt 82 and sheaves 36 and 80 may be comprised of an idler-type belt tensioning roller 84 (which may actually be a free running sheave) rotatably secured as at 86 to one arm 88 of a lever 90 which, in turn, may be pivotally mounted as at 92 to the side of tractor body 76. Another arm 94 of lever 90 is operatively connected to one end of a tension spring 96 which has its other end suitably anchored to body 76 as by spring anchor member 98.

Both the position or roller 84 and the tension applied by roller 84 may be controlled by a suitable linkage means 100 carried generally by the vehicle 10. Such linkage means 100 is illustrated as comprising an actuating rod 102 having one end 104 pivotally received by lever arm 88 at a point generally between pivot 92 and roller 84. The actuating rod 102 is slidably received through a suitable aperture formed in the end 106 of a lever arm 108 of a bell crank 110. The upper end of actuating rod 102 is threaded for a suitable length so as to thereby threadably engage a nut 112. A compression spring 114 is situated generally about the upper portion of actuating rod 102 of bell crank lever arm 108 and a suitable washer-like spring perch 116 held against nut 112.

Bell crank 110 is pivotally connected, as at 118, to a suitable support 120 which may be secured to a portion forming the overall body 76 of tractor 10 or, if desired, such could be made as an integral extension of the frame assembly 14. The other arm 122 of bell crank 110 pivotally receives therein one end 124 of a motion transmitting linkage 126 which has its opposite end 128 pivotally connected to an arm 130 of a manually positionable second bell crank or lever assembly 132.

The bell crank 132 may be pivotally mounted, as at 134, to a mounting block or body 136 which may be suitably secured to cooperating support structure 138 as by suitable clamping members 140 and 142. With the bell crank or lever assembly 132 in the position illustrated, the upward force on lever arm 88 is released thereby permitting tension spring 96 to rotate lever assembly 90 and idler roller 86 generally clockwise (as viewed in FIG. 3) about pivot 92 thereby releasing the tension in the drive belt 82. This, in turn, causes a cessation of power transmission between sheave 80 and sheave 36.

However, whenever handle or arm 144 is moved upwardly (counter-clockwise about pivot 134 as viewed in FIG. 3) motion transmitting linkage 126 is moved generally to the right thereby causing clockwise rotation of bell crank 110 about pivot support 118. In so doing, arm 108 of bell crank 110 moves generally upwardly against the lower end of the preloaded compression spring 114 causing a degree of further compression thereof and consequently raising actuating rod 102. Such motion of rod 102 in turn causes counter-clockwise rotation of lever assembly 90 resulting in a general upward movement of idler or tensioning roller 84. As roller 84 moves upwardly it engages and somewhat depresses the belt 82 thereby shortening the effective length thereof and placing such belt in driving engagement with sheaves 80 and 36. At this time, of course, power is transmitted through belt 82 to the sheave 36 and primary input shaft 34.

In one successful embodiment of the invention, bell cranks 110 and 132 were so situated as to place the line of force, transmitted by motion transmitting linkage 126, above the centerline pivot 134 when the lever assembly 132 is rotated as to engage belt 82. In such an arrangement, the lever arm 144 and mounting bracket 140 were of such configurations as to enable abutting engagement therebetween when the belt 82 was placed in a driving engagement by the upward movement of roller 84.

In view of the preceding, it should be apparent that tension spring 96 serves as a return spring for returning the roller 84 to a "disengaged" position whenever the force applied through the action of lever 132 is removed. Further, it can be seen that when the roller 84 is being moved toward its "engaged" position the actuating force is transmitted through the compression spring 114. Accordingly, a spring 114 may be considered as an adjustment means by which the tension on the belt, as applied by the roller 84, can be selectively adjusted in order to provide optimum operating characteristics matched to the particular terrain or composition of the soil on which the trenching apparatus is to be employed.

Figures 5, 6, 7, 8:
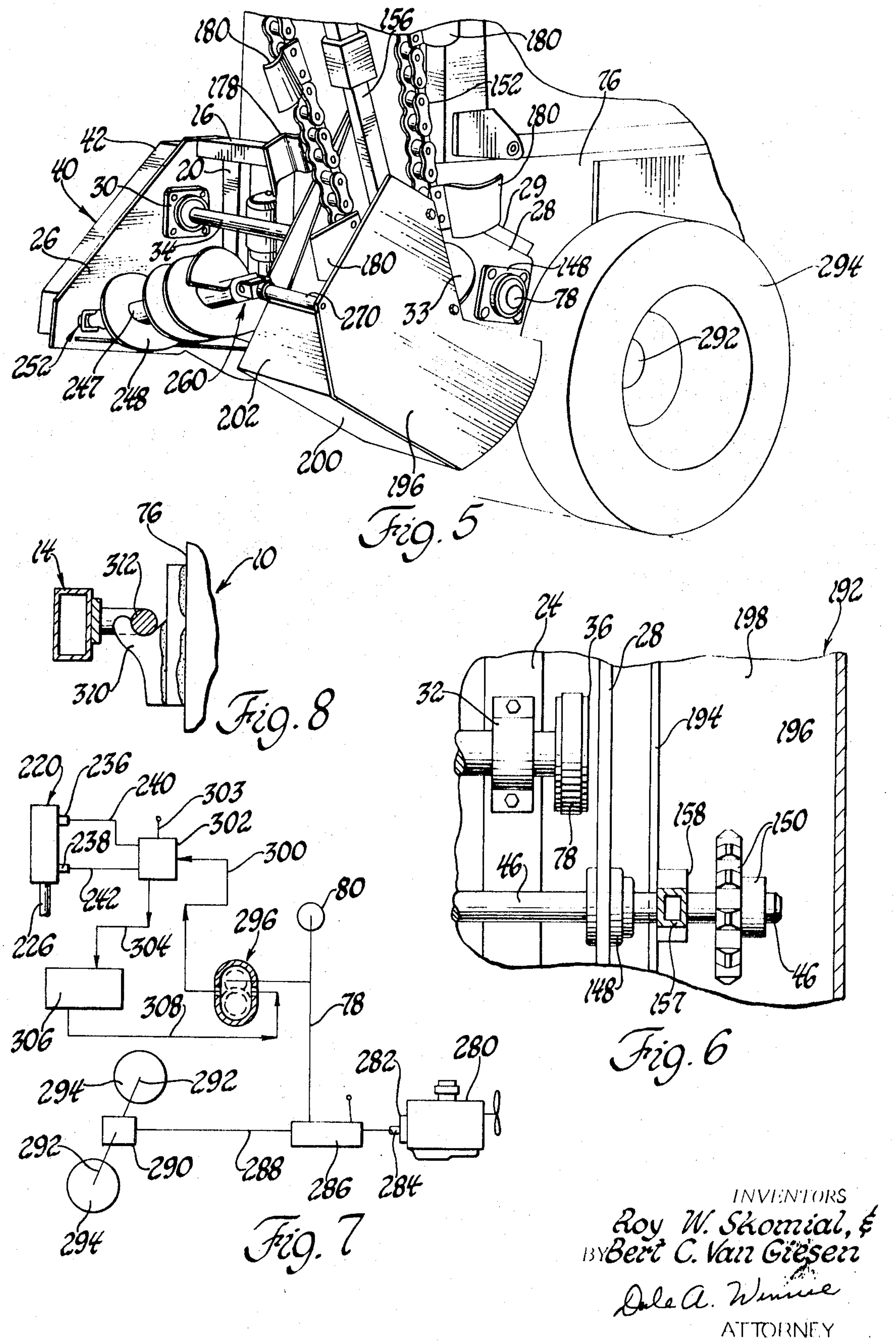
FIG. 5 is a fragmentary elevational perspective view of the vehicle and the trenching apparatus of FIG. 1 with the trenching boom assembly being positioned in a non-digging position.
FIG. 6 is a fragmentary cross-sectional view taken generally on the plane of line 6—6 of FIG. 4 and looking in the direction of the arrows.
FIG. 7 is a schematic representation of the power drive train and hydraulic circuitry employed by the invention as herein disclosed.
FIG. 8 is an enlarged fragmenary cross-sectional view of a modified arrangement for detachably mounting the trenching apparatus to an associated vehicle.

As best shown in both FIGS. 1 and 5, the end cover-like support 28 may be formed to provide upper and lower flanges 29 and 31 which serve to provide a portion through which screws may pass in order to secure that end to the vehicle. Further, it is preferred that a suitable access opening, with a removable capping plate 33, be formed through the main body of support 28 in order to permit ready access to the belts and other elements generally contained therein.

As shown in FIG. 4, drive shaft 46 is further rotatably supported by a bearing within an intermediate bearing block 146, secured to and carried by vertically extending frame member 22, and a third bearing arrangement including a bearing block 148 secured to and carried by the end support plate 28. The rightmost end of shaft 46 has secured thereto, for rotation therewith, a drive sprocket wheel 150 for drivingly engaging the continuous link chain or belt 152 of the digging or trenching boom assembly 154.

As shown in FIGS. 1 and 4, the boom assembly 154 is comprised of a main boom support bar 156 having one end 157 thereof slightly offset (FIG. 4) and connected to shaft 46 as by means of a suitable bearing assembly contained within a bearing or journal block 158 carried by end 157. The swingable end of boom support bar 156 is provided with a sleeve-like mounting assembly 160 having a yoke-like projection which rotatably carries therein an idler type sprocket wheel 162 rotatably mounted to the assembly 160 as by an axle member 164.

Intermediate the ends of the boom support bar 156 are upper and lower (as viewed in FIG. 1) idler wheel support pedestals 166 and 168 respectively suitably secured to the boom bar 156 and carrying idler-type sprocket wheels 170 and 172 as by axles 174 and 176. The continuous chain 152 is also provided, on opposite sides thereof, with a plurality of spaced digger teeth 178 and 180 which may be secured to and carried by the connecting pins of the links comprising the belt 152 as typically illustrated at 182. An actuating and stabilizing arm 184, secured at one end to main boom support bar 156 as at 186, is journalled at its other end about shaft 46 by means of a bearing block 188 containing therein a suitable bearing assembly. If desired, a gussett 190 may be placed generally between and joined, as by welding, to stabilizing bar 184 and boom support bar 156 in order to unitize such members into a rigid subassembly of increased strength.

As best seen in FIG. 4, the invention is also provided with a hood-like structure 192 which may be considered as being a combination chain drive-sprocket guard and a dirt deflector. The hood structure 192 is illustrated as being comprised of generally vertically directed side walls 194 and 196 which are joined to each other by an intermediate curved plate-like portion 198 and generally flat plate portions 200 and 202 (also see FIGS 1 and 5). Such side walls 194, 196 and end plate sections 198, 200 and 202 may be welded to each other so as to form a rigid unitized structure of a scoop-like configuration. The entire structure 192 is, in turn, secured to the main boom support bar 156, for rotation therewith, as by a pair of generally laterally extending support bars 204 and 206 which are welded at their respective one ends to the bar 156 and offset 157. The other ends of support bars 204 and 206 are rigidly connected to side wall 196 of deflector 192 as by bolts 208 and 210 threadably engaged therewith.

As seen in FIG. 1, a suitable vertically extending support strut 22, which may be operatively connected to the frame assembly 14 or formed integrally therewith, supports, at its upper end, spaced support plates 214 and 216 which receive, therebetween, the yoke-like end 218 of a hydraulic piston and cylinder assembly 220. A transversely extending pivot pin 222, passing through cooperating apertures formed in plates 214 and 216 as well as yoke 218, serves to pivotally anchor the upper end of the cylinder housing 224. The piston, slidably contained within the cylinder 224, is operatively connected to a piston rod 226 which has its free end provided with a clevis portion 228 which is pivotally connected, as by a pin 230, to an arm portion 232 secured to and carried by the stablizing support bar 184. Support plates 214 and 216 are each provided with a second aperture, as at 234, which are in alignment with each other and of a size sufficient to at times receive therethrough the pivot anchor pin 222. Further, cylinder assembly 220 is provided with conduit portions 236 and 238 for connection to hydarulic conduits 240 and 242 in order to supply to and exhaust hydraulic fluid from the cylinder assembly in accordance with the operator's dictates.

The invention as herein also includes the use of conveying means 244 for moving the dirt or soil, which has been brought to the ground level by the trenching boom, away from the trench being dug. As best seen in FIGS. 1 and 4, the conveying means 244 is illustrated as being comprised of an auger or screw-like conveyor assembly 246 having a tubular shaft like body 247 carrying a spiral or helical segment 248 secured thereto for rotation therewith. As best shown in FIG. 4, the stub shaft 52 is operatively connected to one end 250 of a universal joint assembly 252 having its other end 254 connected to and carried by a shaft portion 256 axially slidably received within the open end of the tubular body 247. Shaft portion 256 is suitably keyed to tubular shaft 247 by any suitable means well know in the art as by, for example, a plurality of axially extending splines formed externally on shaft portion 256 and a plurality of coacting axially extending splines formed internally of tubular member 247.

The other end of screw-like conveyor assembly 246 is similarly connected to one end 258 of a universal joint assembly 260 by means of a shaft portion 262 slidably received wtihin end 264 of the tubular shaft 247. The other end 266 of the universal joint 260 is carried by a shaft portion 268 both slidably and rotatably received within a journal like tubular support member 270 which is secured to, as by welding, to the side wall 196 and plate 202 of the soil deflector assembly 192.

FIG. 7 somewhat schematically illustrates the power supplying means and related power train associated with the invention as herein disclosed. The arrangement as shown in FIG. 7 is, of course, by way of example and not of limitation. However, in FIG. 7 a prime mover or engine 280, carried by the vehicle 10, is provided with a suitable main clutching assembly 282 which has an output shaft 284 providing an input to an associated selectively engageable transmission assembly 286. Suitable output shaft means 288, including possibly a differential 290, supply driving power via axle shafts 292 to the vehicular ground-engaging wheels 294.

The trenching main take-off shaft 78 may also be operatively connected to transmission 286 and a suitable hydraulic pump assembly 296 in order to provide hydraulic pressure to the piston and cylinder assembly 220. The pressurized hydraulic fluid supplied via conduit means 300 is directed to the operator actuated control valve assembly 302 which, depending on the operator's selection, will direct such high pressure fluid to cylinder assembly 220 via conduit 240 (if the piston rod 226 is to be extended) or conduit 242 (if the piston rod 226 is to be withdrawn). It should, of course, be apparent that depending upon the particular conduit selected for conveying such high pressure, the other conduit will be vented to low return pressure and such venting is completed as by conduit means 304 leading to reservoir 306 which supplies low pressure fluid to the inlet of pump 296 via conduit means 308.

Before progressing to the discussion of the operation of the invention, it should be mentioned that the entire trenching apparatus could be supported on the vehicle 10 as by a pair of hook-like supports, one of which is shown at 310 in FIG. 8. Each of the hook supports could be welded to the body 76 or support frame of the vehicle 10 while the trenching frame assembly 14 could be provided with a pair of cooperating laterally positioned open handle-like members, as at 312, which would overlay and be vertically supported by the hooks 310. The entire frame assembly 14 could then be maintained in lateral stability by the use of a suitable quick acting clamp or even a very limited number of screws. This would provide an additional feature of being able to quickly and easily detach the entire trenching apparatus from the vehicle if that same vehicle were to be employed for some inconsistent purpose.

OPERATION OF THE INVENTION

In view of the preceding, the general operation of the invention should be apparent. That is, when power is supplied to the main take-off shaft 78 and lever 144 (FIG. 3) is moved upwardly, idler roller engages the drive belt 82 thereby sufficiently tensioning the belt 82 as to cause power to be transmitted from sheave 80 to sheave 36 and main power shaft 32. The rotation of sheave 36, as viewed in FIG. 3, is clockwise thereby causing the drive gear 38 to rotate counter-clockwise as viewed in FIG. 2. Power is thusly transmitted through gear 44 to shaft 46 causing clockwise rotation thereof, as viewed in FIG. 2. This, in turn, rotates the chain drive sprocket 150 of the trenching boom assembly 154 causing the chain 152 to move generally clockwise about the boom support 156 as viewed in FIG. 1.

Simultaneously, the power transmitting link belt 54 of FIG. 2 rotates gear 56 and stub shaft 52 clockwise (as viewed in FIG. 2) thereby rotatingly driving the conveyor or auger assembly 246.

Even though the boom assembly 154 is susceptible to being placed in varying attitudes or positions, for purposes of description let it be assumed that the boom assembly 154 would be placed in any one of three different positions. The first of such three positions could be considered as the digging position wherein the boom assembly 154 is rotated downwardly to a position generally illustrated in FIG. 9 wherein the phantom line 314 is employed to represent, generally, the longitudinal axis of the boom support bar 156 extending downwardly through the top of ground line 316. The second of such three positions could be considered as one wherein the boom assembly 154 is raised to a horizontal position, as shown in FIG. 1 and deflector 192 correspondingly positioned in FIG. 10, wherein the vehicle 10 and trenching apparatus 12 can be moved to a second digging or trenching operation at the same general location. The third of such three positions could be considered as the "boom-up" position generally depicted in FIG. 5 and deflector 192 correspondingly positioned in FIG. 11. The boom assembly 154 would be placed in such a position during those situations wherein, for example, the vehicle 10 and the trenching apparatus 12 were to be carried atop a trailor and transported to a totally different location.

The boom digging assembly 154, is, of course, placed in any of such three positions by the actuation of the piston and cylinder assembly 220. For example, if the boom assembly were in a horizontal position as shown in FIG. 1 and it was desired to raise it to the boom-up position of FIG. 5, the operator need only actuate control lever 303 of the control valve assembly 302 (FIG. 7) to direct high hydraulic pressure to cylinder assembly 224 via conduit means 242 and 238 thereby causing withdrawal of piston rod 226 and the upward movement of the swingable end of the boom assembly 154 until such time as the position thereof illustrated in FIG. 5 is attained. Likewise, if the boom assembly 154 were to be lowered to a digging position as illustrated, for example, by the phantom line 314 of FIG. 9, the operator only has to actuate control lever 303 to direct high hydraulic pressure to cylinder assembly 224 via conduit means 240 and 236 thereby causing extension of piston rod 226 and the downward movement of the swingable end of the boom assembly 154.

As is clearly evident especially from FIGS. 4, 5 and 6, the boom assembly 154 is placed outboard of the body of vehicle 10 so that the line or path of digging is in a plane eccentrically disposed with respect to the vehicle. By having the digging action take place generally outboard of the vehicle 10, the operator is then able to have the vehicle 10 and trencher 12 move slowly, generally in the direction of arrow B of FIG. 1, while in extremely close proximity to a wall of other structure, both above and below the surface of the ground, which is parallel to the direction of motion or travel of vehicle 10.

Figure 9:
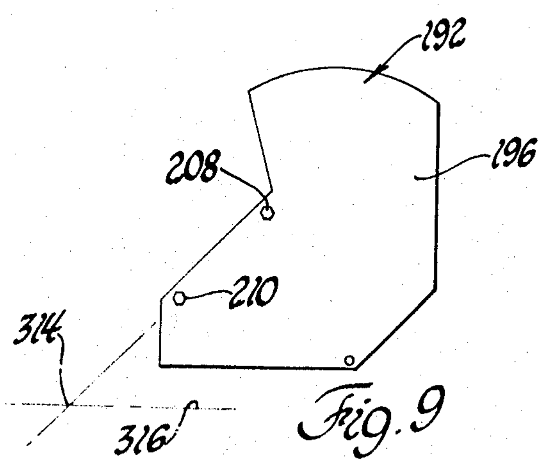
FIG. 9 is a side elevational view of one of the elements of the invention illustrated in a position assumed when the boom-assembly is in its digging position.
Figure 10:
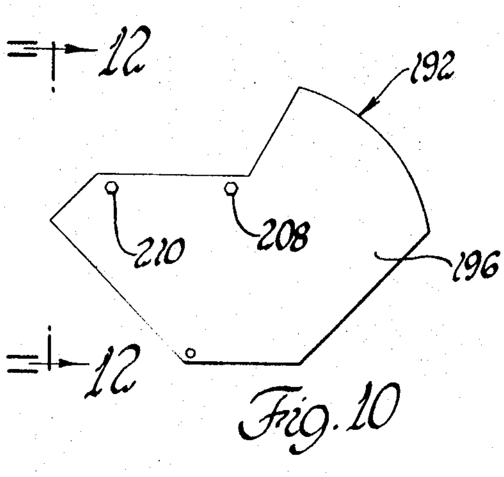
FIG. 10 is a side elevational view of the element of FIG. 9 but in a position assumed when the boom assembly is in a generally horizontal position as shown in FIG. 1.
Figure 11:
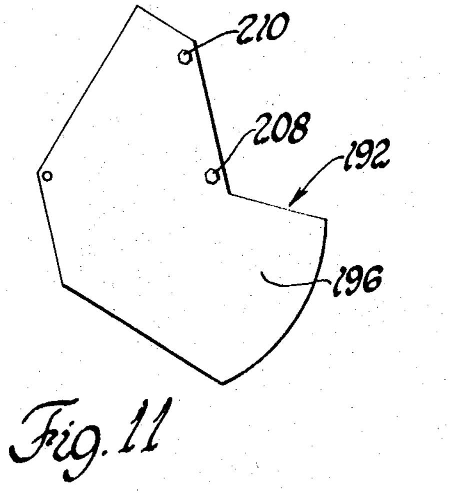
FIG. 11 is a side elevational view of the element shown in FIGS. 9 and 10 but in a position assumed when the boom assembly is in a position generally shown in FIG. 5.
Figure 12:
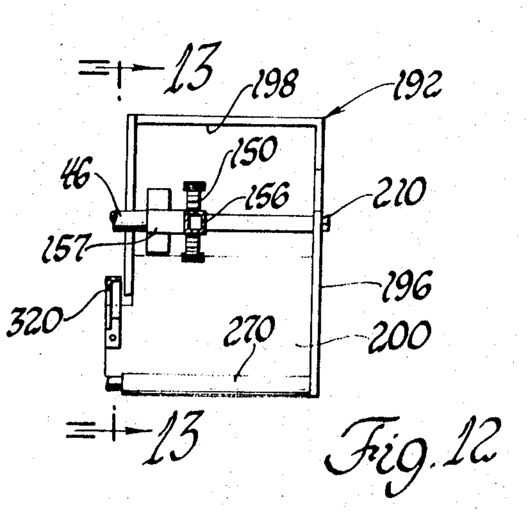
FIG. 12 is an end elevational view taken generally on the plane of line 12—12 of FIG. 10 and looking in the direction of the arrows.
Figure 13:
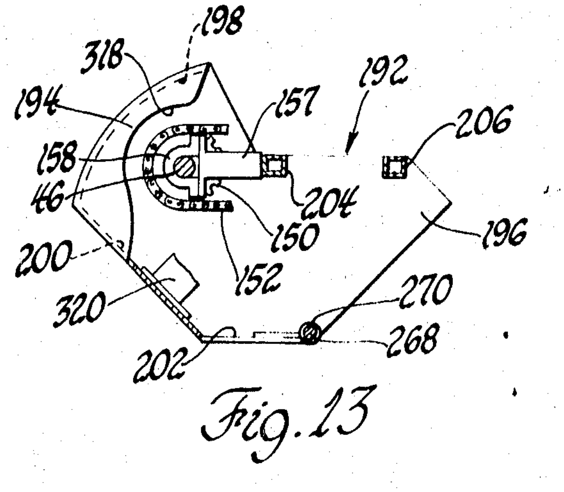
FIG. 13 is a side elevational view taken generally on the plane of line 13—13 of FIG. 12 and looking in the direction of the arrows.

Another important advantage of the invention, as previously indicated, is the provision of the guard-like deflector assembly 192 also shown in varying operating positions in FIGS. 9 through 13. The hood-like deflector 192, as best seen in FIGS. 12 and 13, has an inner side wall 194 which is contoured or cut-away, as generally shown at 318 so as to closely conform to but avoid the shaft 46 and related support structure. It can be seen that when the boom assembly 154 and deflector hood 192 are rotated to a digging position as generally depicted by FIG. 9, wall 196 in cooperation with plates 202, 200 and 198 will function to prevent any dirt dug by the boom assembly 154 from falling or moving through such directions. Likewise, the inner side wall 194 will prevent the dirt from being forced directly sideways and will instead cause the loose dirt to be forced generally downwardly toward ground level. This action combined with the force of the dirt being brought up by the moving digging teeth 178 and 180 causes a resultant force which directs the dirt both downwardly and sideways out of the interior of the deflector assembly and into the auger-type conveyor 246 (or slightly ahead of such conveyor) thereby enabling the conveyor 246 to engage and physically move such deflected dirt from the trenching line towards the other side of the vehicle. As best shown in FIGS. 12 and 13, an additional strut-like support 320 may be carried by an extension of plate 200 and suitably secured at its upper end as to the boom assembly stabilizing bar 184 in order to increase the rigidity and support of the deflector assembly 192.

The conveyor means 244 presents additional benefits. That is, by virtue of its position, as shown generally in FIG. 1, it is effective for not only conveying the loose dirt away from the trenching line but also serves to bank such dirt in a manner so that the highest portion of such banked dirt is furthest removed from the trench. It should also be noted that whenever the digging boom assembly 154 is raised to a horizontal position, the right end (as viewed in either of FIGS. 1, 4 or 5) of the conveyor means is automatically raised a substantial distance thereby permitting the vehicle 10 to propel itself and the trenching apparatus to a second spaced digging operation. Further, as seen in FIG. 5, whenever the boom assembly 154 is fully raised, the right end of the conveyor means 244 is also further automatically raised thereby preventing any possible damage thereto while in preparation for or while in actual transport.

The invention as herein disclosed also provides a further important advantage or feature, that being, the ability to employ a short stroke and therefore cheaper piston and cylinder assembly 220. By "short stroke" it is meant that when fully extended, the piston rod 226 would hold the boom assembly 154 in a generally horizontal position, as shown in FIG. 1, whenever the opposite end of the cylinder housing was anchored in the upper apertures formed in support plates 214, 216 as shown. The additional downward movement of the boom assembly 154 to its digging position can then be achieved by disengaging the pivot anchor rod 222, from the position shown, and moving it down to a position whereat it would be received in the aligned apertures 234 also formed in the support plates 214, 216. Such vertical re-positioning of the yoke end 218 of cylinder 224 would then provide the required additional motion to move the boom assembly 154 downwardly into its digging position.

Figure 14:
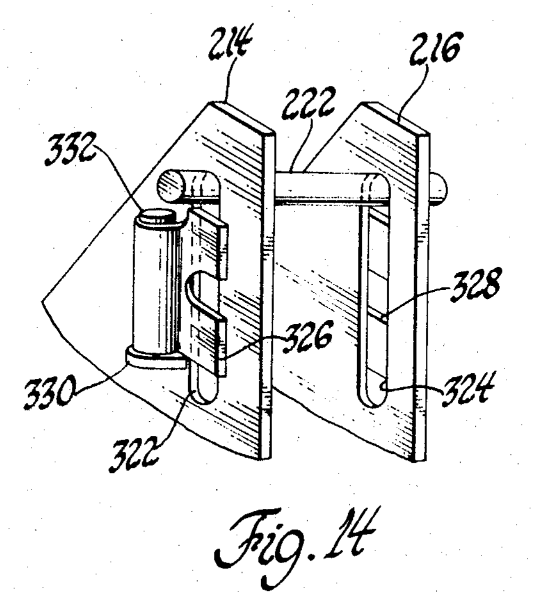
FIG. 14 is an enlarged fragmentary perspective view of modified structure for anchoring one end of the boom-actuating hydraulic cylinder assembly shown in FIG. 1.

If it were desired to employ such a "short stroke" cylinder assembly, a modified arrangement as shown in FIG. 14 could be employed for anchoring the yoke end 218 of the cylinder 224. In FIG. 14, all elements which are like or similar to those of FIG. 1 are identified with like reference numbers. In FIG. 14, a pair of aligned slots 322 and 324 are respectively formed in support plates 214 and 216. The cylinder anchor pin 222 is slidably received therethrough while a pair of hinged abutment members 326 and 328, respectively carried by plates 214 and 216 serve to maintain the anchor rod 222 in its upper position. Typically, each of the hinged abutment plates is secured to the cooperating support plate as by a hinge bracket 330 and cooperating pintle 332.

Accordingly, it can be seen that if the upper yoke portion 218 of the cylinder 224 is to be moved from its uppermost to its lowermost position, all that is necessary with the arrangement of FIG. 14 is to swing each of the abutment plates 326 and 328 away from the vertical support plates 214 and 216 thereby allowing the anchor rod or pin 222 to slide downwardly to the bottoms of the slots 322 and 324. This, of course, obviates the necessity of disassembling the structure as would be the case with that shown in FIG. 1.

Although only one preferred embodiment of the invention along with selected modifications thereof have been disclosed and described, it is apparent that other embodiments and modifications of the invention are possible within the scope of the appended claims.

We claim:

1. A trenching apparatus, comprising supporting means adapted to be carried by a vehicle, a boom-type powered digging structure pivotally carried at one end and operatively connected to said supporting means, loose-dirt deflector means operatively connected to said boom-type digging structure so as to be pivotally rotatable therewith about an axis of pivotal rotation common to said boom-type digging structure, and powered conveyor means operatively carried by said supporting means, first means operatively carried by said supporting means for universally pivotally supporting one end of said conveyor means at a generally fixed height with respect to said supporting means, second means operatively carried by said boom-type digging structure for universally pivotally supporting an other end of said conveyor means, said second means being effective to cause upward and downward swinging motion of said other end generally about said one end as said boom-type digging structure is pivotally rotated upward and downward, said deflector means being adapted to deflect such loose dirt as is dug by said boom-type digging structure toward said other end of said powered conveyor means, said conveyor means being located entirely on one side of said boom-type digging structure and being effective to physically move said deflected loose-dirt a substantial distance in one direction away from the trench which is being dug by said boom-type digging structure.

2. A trenching apparatus according to claim 1 wherein said boom-type digging structure is eccentrically mounted as to be generally outboard of said vehicle.

3. A trenching apparatus according to claim 1 wherein said conveyor means comprises rotary auger type conveyor means carried in a position so as to be generally transverse to said boom-type digging structure, and wherein said first means comprises journalling connecting means operatively supporting and connecting said one end of said conveyor means to said supporting means and for transmitting power from a related source of power to said one end of said conveyor means.

4. A trenching apparatus, comprising supporting means adapted to be carried by a vehicle, a boom-type powered digging structure pivotally carried at one end and operatively connected to said supporting means, loose-dirt deflector means operatively connected to said boom-type digging structure so as to be pivotally rotatable therewith about an axis of pivotal rotation common to said boom-type digging structure, and powered conveyor means operatively carried by said supporting means in a manner as to have one end thereof moveable upwardly and downwardly in accordance with the pivotal rotation of said boom-type digging structure and an other end generally fixedly located at a selected height and carried by said supporting means, said deflector means being adapted to deflect such loose-dirt as is dug by said boom-type digging structure toward one end of said powered conveyor means, and said conveyor means being effective to physically move said deflected loose-dirt a substantial distance in one direction away from the trench which is being dug by said boom type digging structure, said conveyor means comprising a rotary auger type conveyor carried in a position so as to be axially generally transverse to said boom-type digging structure and disposed substantially entirely on one side of said boom-type digging structure, including power transmitting means adapted for connection to a source of power, said power transmitting means including a first drive portion operatively connected to said boom-type digging structure for providing thereto power for digging said trench and also including a second drive portion separate and distinct from said first drive portion operatively connected to an end of said auger type conveyor furthermost away from said boom-type digging structure for providing thereto power for physically moving said loose-dirt away from said trench.

5. A trenching apparatus, comprising supporting means adapted to be carried by a vehicle, a boom-type powered digging structure pivotally carried at one end and operatively connected to said supporting means, loose-dirt deflector means operatively connected to said boom-type digging structure so as to be pivotally rotatable therewith about an axis of pivotal rotation common to said boom-type digging structure and powered conveyor means operatively carried by said supporting means in a manner as to have one end thereof moveable upwardly and downwardly in accordance with the pivotal rotation of said boom-type digging structure and an other end generally fixedly located at a selected height and carried by said supporting means, said deflector means being adapted to deflect such loose-dirt as is dug by said boom-type digging structure toward one end of said powered conveyor means, and said conveyor means being effective to physically move said deflected loose-dirt a substantial distance in one direction away from the trench which is being dug by said boom-type digging structure, said deflector means comprising a hood-like structure directly connected to and supported by said boom-type digging structure at said one end thereof for pivotal rotation therewith, said conveyor means comprising a rotary auger type conveyor carried in a position so as to be generally transverse to said boom-type digging structure and disposed substantially entirely on one side of said boom-type digging structure, said auger type conveyor having a first end fixedly universally journalled to said supporting means at a predetermined height and a second swingable end universally journalled to said hood-like structure, and said hood-like structure being effective to swingably move said second end of said auger type conveyor upwardly and downwardly in accordance with upward and downward pivotal movement of said boom-type digging structure.

6. A trenching apparatus, comprising supporting means adapted to be carried by a vehicle; a boom-type powered digging structure pivotally carried at one end and operatively connected to said supporting means; loose-dirt deflector means operatively carried by said supporting means and adapted to deflect such loose-dirt as is dug by said boom-type digging structure; and powered conveyor means operatively carried by said supporting means; said conveyor means being effective to physically move said deflected loose-dirt a substantial distance away from the trench which is being dug by said boom-type digging structure; said boom-type digging structure comprising a main boom support bar, first bearing means carried by one end of said support bar, said first bearing means effectively journaling said one end to a supporting shaft, a drive sprocket rotatable in a plane generally passing through the longitudinal axis of said boom support bar, a first idler sprocket carried at the opposite end of said boom support bar, said opposite end of said boom support bar being pivotally swingable about said supporting shaft, second and third idler sprockets carried by said boom support bar at opposite sides thereof and generally between said drive sprocket and said first idler sprocket, a continuous chain belt engaging each of said sprockets, a plurality of digger teeth carried by said chain belt, a stabilizing bar having one end secured to said boom support bar, second bearing means carried by the other end of said stabilizing bar, said second bearing means effectively journaling said stabilizing bar about a centerline coincident with the centerline of said supporting shaft, and means operatively connected to said boom support bar for causing pivotal rotation thereof about said supporting shaft; said deflector means comprises a hood-like structure having side walls and end walls defining a scoop-like opening, wherein said deflector means is secured to said boom support bar for rotation therewith, said side walls and end walls collectively defining a chamber-like space substantially enveloping said drive sprocket; and wherein said conveyor means comprises an axially extending rotatable screw-type conveyor member having one end universally pivotally connected to a wall of said deflector means, the other end of said screw-type conveyor member being universally pivotally connected to a fixed drive shaft operatively connected to a source of power for rotatingly driving said conveyor member.

7. A trenching apparatus, comprising supporting means adapted to be carried by a vehicle; a boom-type powered digging structure pivotally carried at one end and operatively connected to said supporting means; loose dirt deflector means operatively carried by said supporting means and adapted to deflect such loose-dirt as is dug by said boom-type digging structure; and powered conveyor means operatively carried by said supporting means; said conveyor means being effective to physically move said deflected loose-dirt a substantial distance away from the trench which is being dug by said boom-type digging structure; said boom-type digging structure comprising a main boom support bar, first bearing means carried by one end of said support bar, said first bearing means effectively journaling said one end to a supporting shaft, a drive sprocket rotatable in a plane generally passing through the longitudinal axis of said boom support bar, a first idler sprocket carried at the opposite end of said boom support bar, said opposite end of said boom support bar being pivotally swingable about said supporting shaft, second and third idler sprockets carried by said boom support bar at opposite sides thereof and generally between said drive sprocket and said first idler sprocket, a continuous chain belt engaging each of said sprockets, a plurality of digger teeth carried by said chain belt, a stabilizing bar having one end secured to said boom support bar, second bearing means carried by the other end of said stabilizing bar, said second bearing means effectively journaling said stabilizing bar about a centerline coincident with the centerline of said supporting shaft, and means operatively connected to said boom support bar for causing pivotal rotation thereof about said supporting shaft; said deflector means comprising a hood-like structure having side walls and end walls defining a scoop-like opening, wherein said deflector means is secured to said boom support bar for rotation therewith, said side walls and end walls collectively defining a chamber-like space substantially enveloping said drive sprocket; and including hydraulic pressure responsive piston and cylinder assembly means operatively connected at one end to said boom support bar and detachably secured at another end to cooperating vertically disposed support structure carried by said vehicle, said support structure including means for anchoring said other end in either of at least two operative positions, said means for anchoring said other end comprising an upwardly directed support column including generally vertically extending slot means formed therein for the pivotal reception of an anchor pin passing therethrough and through said other end of said cylinder assembly, and moveable latching means carried by said column for at times abuttingly engaging and holding said anchor pin in an upper one of said at least two operating positions and at other times permitting said anchor pin to move downwardly through said slot means to a lower one of said two operating positions.

References Cited

UNITED STATES PATENTS

| | | | |
|---|---|---|---|
| 1,073,227 | 9/1913 | Funk | 37—86 |
| 1,180,164 | 4/1916 | Lorio | 37—86 |
| 1,767,017 | 6/1930 | Scheckler | 37—86 |
| 2,708,798 | 5/1955 | Warner et al. | 37—86 |
| 2,710,466 | 6/1955 | Chartier | 37—90 |
| 2,748,504 | 6/1956 | McIninch | 37—86 |
| 3,044,194 | 7/1962 | Balkheimer | 37—86 |
| 3,057,088 | 10/1962 | George et al. | 37—86 |
| 3,209,473 | 10/1965 | Davis | 37—86 |
| 3,398,471 | 8/1968 | Brown | 37—86 |

FOREIGN PATENTS

| | | | |
|---|---|---|---|
| 728,686 | 4/1955 | Great Britain | 37—86 |
| 764,437 | 12/1956 | Great Britain | 37—86 |

ROBERT E. PULFREY, Primary Examiner

C. D. CROWDER, Assistant Examiner

U.S. Cl. X.R.

37—191 A